(12) United States Patent
Flores et al.

(10) Patent No.: US 9,098,438 B2
(45) Date of Patent: Aug. 4, 2015

(54) SYNCHRONIZED VOLTAGE SCALING AND DEVICE CALIBRATION

(75) Inventors: Jose Luis Flores, Richardson, TX (US); Lewis Nardini, Richardson, TX (US); Ritesh Sojitra, Plano, TX (US); Denis Roland Beaudoin, Rowlett, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 849 days.

(21) Appl. No.: 13/218,116

(22) Filed: Aug. 25, 2011

(65) Prior Publication Data

US 2012/0084575 A1    Apr. 5, 2012

Related U.S. Application Data

(60) Provisional application No. 61/388,255, filed on Sep. 30, 2010.

(51) Int. Cl.
*G06F 1/32* (2006.01)
*G06F 13/14* (2006.01)

(52) U.S. Cl.
CPC ..................................... *G06F 13/14* (2013.01)

(58) Field of Classification Search
None
See application file for complete search history.

(56) References Cited

U.S. PATENT DOCUMENTS

| 6,868,503 | B1 |   | 3/2005 | Maksimovic et al. |
| 7,590,008 | B1 | * | 9/2009 | Roge et al. ............. 365/189.011 |
| 2003/0169192 | A1 | * | 9/2003 | Jonsson ........................ 341/118 |
| 2008/0120065 | A1 |   | 5/2008 | Joshi et al. |
| 2011/0004774 | A1 | * | 1/2011 | Hansquine et al. ........... 713/310 |
| 2011/0047319 | A1 | * | 2/2011 | Jeon et al. ..................... 711/103 |

OTHER PUBLICATIONS

"TMS320C6678 Multicore Fixed and Floating-Point Digital Signal Processor", Data Manual, SPRS691, Texas Instruments Incorporated, Nov. 2010, pp. 1-259.
"JEDEC Standard DDR3 Sdram Specification", JESD79-3E (Revision of JESD79-3D), JEDEC Solid State Technology Association, Arlington, VA, Jul. 2010, pp. 1-62.

* cited by examiner

*Primary Examiner* — Paul Yanchus, III
(74) *Attorney, Agent, or Firm* — Robert D. Marshall, Jr.; Frank D. Cimino

(57) ABSTRACT

A method is provided for scaling voltage in an integrated circuit. A calibration operation is performed on a functional module on the integrated circuit periodically at a rate T1. At least one parameter on the integrated circuit in monitored to determine when a performance threshold is reached. A change is initiated to an operating voltage for a portion of the integrated circuit in response to reaching the threshold. The rate of performing calibration operation is increased to a higher rate T2 for a window of time W in response to initiating the change in operating voltage, after which the rate of performing calibration is returned to the rate T1.

22 Claims, 6 Drawing Sheets

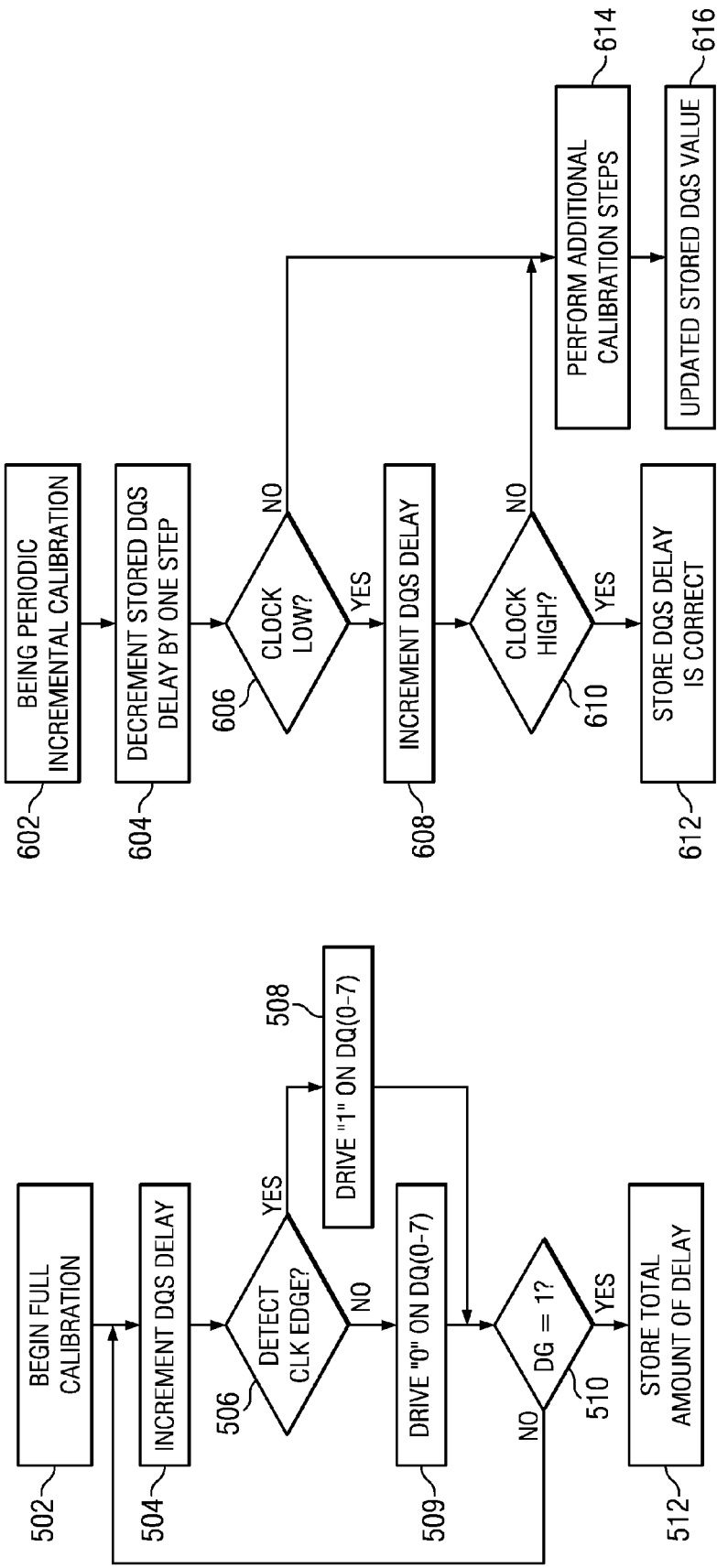

SYNCHRONIZED VOLTAGE SCALING AND DEVICE CALIBRATION

CLAIM OF PRIORITY UNDER 35 U.S.C. 119(e)

The present application claims priority to and incorporates by reference U.S. Provisional Application No. 61/388,255, filed Sep. 30, 2010.

FIELD OF THE INVENTION

This invention generally relates to management of power in a system on a chip, and more particularly to maintaining calibration of a device on the chip or coupled to the chip when voltage levels are changed.

BACKGROUND OF THE INVENTION

System on Chip (SoC) is a concept that strives to integrate more and more functionality into a given device. This integration can take the form of either hardware or solution software. Performance gains are traditionally achieved by increased clock rates and more advanced processor nodes. Many SoC designs pair a digital signal processor (DSP) with a reduced instruction set computing (RISC) processor to target specific applications. A more recent approach to increasing performance has been to create multi-core devices. In these scenarios, management of power dissipation on the chip may be done to conserve power.

BRIEF DESCRIPTION OF THE DRAWINGS

Particular embodiments in accordance with the invention will now be described, by way of example only, and with reference to the accompanying drawings:

FIG. 5 is a flow diagram illustrating full DDR3 calibration;

FIG. 6 is a flow diagram illustrating incremental DDR3 calibration;

Figure 1:
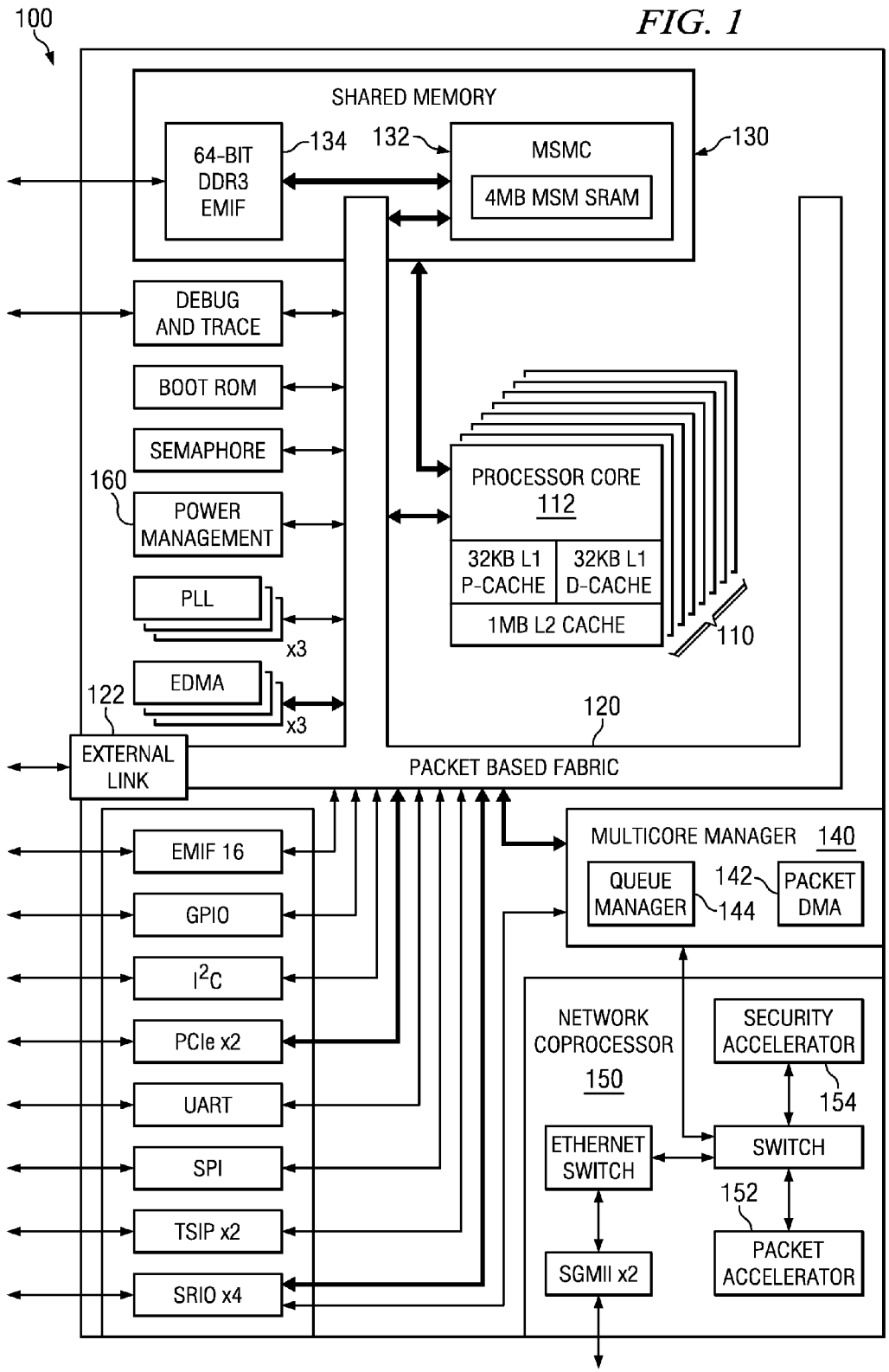
FIG. 1 is a functional block diagram of a system on chip (SoC) that includes an embodiment of the invention.

Other features of the present embodiments will be apparent from the accompanying drawings and from the detailed description that follows.

DETAILED DESCRIPTION OF EMBODIMENTS OF THE INVENTION

Specific embodiments of the invention will now be described in detail with reference to the accompanying figures. Like elements in the various figures are denoted by like reference numerals for consistency. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

High performance computing has taken on even greater importance with the advent of the Internet and cloud computing. To ensure the responsiveness of networks, online processing nodes and storage systems must have extremely robust processing capabilities and exceedingly fast data-throughput rates. Robotics, medical imaging systems, visual inspection systems, electronic test equipment, and high-performance wireless and communication systems, for example, must be able to process an extremely large volume of data with a high degree of precision. A multi-core architecture that embodies an aspect of the present invention will be described herein. In a typically embodiment, a multi-core system is implemented as a single system on chip (SoC). As used herein, the term "core" refers to a processing module that may contain an instruction processor, such as a digital signal processor (DSP) or other type of microprocessor, along with one or more levels of cache that are tightly coupled to the processor.

An embodiment of the invention may include on-chip hardware to initiate calibration of high speed dual data rate three (DDR3) interface logic in response to voltage adjustments by an external variable power supply. The on-chip hardware may include one or more sensors that dynamically measure the frequency response of the chip to changes in temperature over time and attempt to control a supply voltage provided by the variable power supply in order to maintain a minimum required operating frequency while optimizing power consumption. As these adjustments are made, care must be taken to ensure that performance critical interfaces such as DDR3 are able to operate through these changes in voltage. The analog circuits within a DDR3 memory device may be sensitive to supply voltage. The JEDEC DDR3 standard describes a read/write leveling calibration technique to support self calibrating compensation for critical DDR3 interfaces. Other devices, such as a serializer/deserializer (SERDES) device may also need to be calibrated for optimal operation in response to voltage/temperature changes. An improved scheme of calibrating temperature sensitive interface devices will be described in more detail below. A low latency mechanism is provided to initiate calibration based on a hardware event request mechanism generated from an on-chip voltage request interface to the external variable power supply. The improved calibration scheme provides an ability to close the loop between on-chip power optimization through dynamic voltage adjustment and hardware calibration/compensation techniques to seamlessly deal with ramps in power supply voltage.

FIG. 1 is a functional block diagram of a system on chip (SoC) 100 that includes an embodiment of the invention. System 100 is a multi-core SoC that includes a set of processor modules 110 that each include a processor core, level one (L1) data and instruction caches, and a level two (L2) cache. In this embodiment, there are eight processor modules 110; however other embodiments may have fewer or greater number of processor modules. In this embodiment, each processor core is a digital signal processor (DSP); however, in other embodiments other types of processor cores may be used. A packet-based fabric 120 provides high-speed non-blocking channels that deliver as much as 2 terabits per second of on-chip throughput. Fabric 120 interconnects with memory subsystem 130 to provide an extensive two-layer memory structure in which data flows freely and effectively between processor modules 110, as will be described in more detail below. An example of SoC 100 is embodied in an SoC from Texas Instruments, and is described in more detail in "TMS320C6678—Multi-core Fixed and Floating-Point Signal Processor Data Manual", SPRS691, November 2010, which is incorporated by reference herein.

SoC 100 includes power management logic 160 that includes one or more sensors that dynamically measure the frequency response of the chip to changes in temperature over time and attempts to control a supply voltage provided by a variable power supply in order to maintain a minimum required operating frequency while optimizing power consumption. As these adjustments are made, care must be taken to ensure that performance critical interfaces such as DDR3 are able to operate through these changes in voltage, as will be described in more detail with reference to FIG. 2.

External link 122 provides direct chip-to-chip connectivity for local devices, and is also integral to the internal processing architecture of SoC 100. External link 122 is a fast and efficient interface with low protocol overhead and high throughput, running at an aggregate speed of 50 Gbps (four lanes at 12.5 Gbps each). Working in conjunction with a routing manager 140, link 122 transparently dispatches tasks to other local devices where they are executed as if they were being processed on local resources.

There are three levels of memory in the SoC 100. Each processor module 110 has its own level-1 program (L1P) and level-1 data (L1D) memory. Additionally, each module 110 has a local level-2 unified memory (L2). Each of the local memories can be independently configured as memory-mapped SRAM (static random access memory), cache or a combination of the two.

In addition, SoC 100 includes shared memory system 130, comprising internal and external memory connected through the multi-core shared memory controller (MSMC) 132. MSMC 132 allows processor modules 110 to dynamically share the internal and external memories for both program and data. The MSMC internal RAM offers flexibility to programmers by allowing portions to be configured as shared level-2 RAM (SL2) or shared level-3 RAM (SL3). SL2 RAM is cacheable only within the local L1P and L1D caches, while SL3 is additionally cacheable in the local L2 caches.

External memory may be connected through the same memory controller 132 as the internal shared memory via external memory interface (EMIF) 134, rather than to chip system interconnect as has traditionally been done on embedded processor architectures, providing a fast path for software execution. In this embodiment, external memory may be treated as SL3 memory and therefore cacheable in L1 and L2.

SoC 100 may also include several co-processing accelerators that offload processing tasks from the processor cores in processor modules 110, thereby enabling sustained high application processing rates. SoC 100 may also contain an Ethernet media access controller (EMAC) network coprocessor block 150 that may include a packet accelerator 152 and a security accelerator 154 that work in tandem. The packet accelerator speeds the data flow throughout the core by transferring data to peripheral interfaces such as the Ethernet ports or Serial RapidIO (SRIO) without the involvement of any module 110's DSP processor. The security accelerator provides security processing for a number of popular encryption modes and algorithms, including IPSec, SCTP, SRTP, 3GPP, SSL/TLS and several others.

Multi-core manager 140 provides single-core simplicity to multi-core device SoC 100. Multi-core manager 140 provides hardware-assisted functional acceleration that utilizes a packet-based hardware subsystem. With an extensive series of more than 8,000 queues managed by queue manager 144 and a packet-aware DMA controller 142, it optimizes the packet-based communications of the on-chip cores by practically eliminating all copy operations.

The low latencies and zero interrupts ensured by multi-core manager 140, as well as its transparent operations, enable new and more effective programming models such as task dispatchers. Moreover, software development cycles may be shortened significantly by several features included in multi-core manager 140, such as dynamic software partitioning. Multi-core manager 140 provides "fire and forget" software tasking that may allow repetitive tasks to be defined only once, and thereafter be accessed automatically without additional coding efforts.

Two types of buses exist in SoC 100 as part of packet based switch fabric 120: data buses and configuration buses. Some peripherals have both a data bus and a configuration bus interface, while others only have one type of interface. Furthermore, the bus interface width and speed varies from peripheral to peripheral. Configuration buses are mainly used to access the register space of a peripheral and the data buses are used mainly for data transfers. However, in some cases, the configuration bus is also used to transfer data. Similarly, the data bus can also be used to access the register space of a peripheral. For example, DDR3 memory controller 134 registers are accessed through their data bus interface.

Processor modules 110, the enhanced direct memory access (EDMA) traffic controllers, and the various system peripherals can be classified into two categories: masters and slaves. Masters are capable of initiating read and write transfers in the system and do not rely on the EDMA for their data transfers. Slaves on the other hand rely on the EDMA to perform transfers to and from them. Examples of masters include the EDMA traffic controllers, serial rapid I/O (SRIO), and Ethernet media access controller 150. Examples of slaves include the serial peripheral interface (SPI), universal asynchronous receiver/transmitter (UART), and inter-integrated circuit (I2C) interface.

Figure 2:
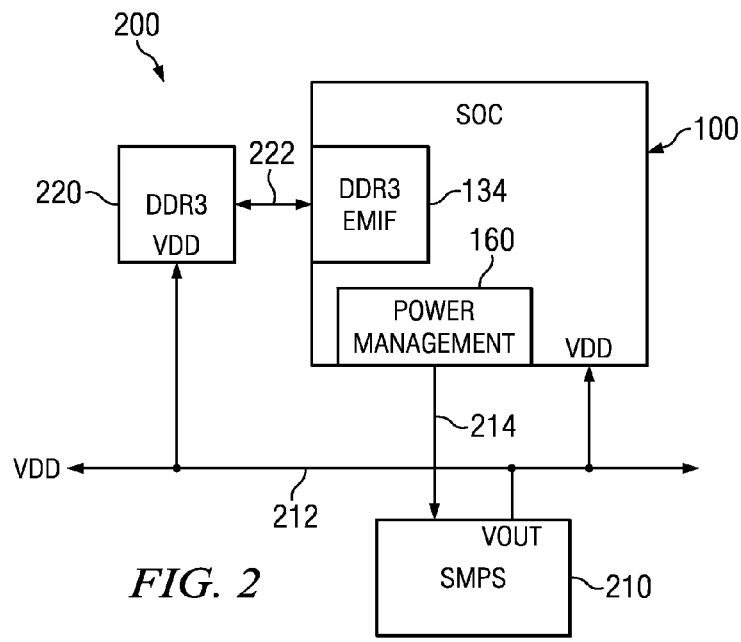
FIG. 2 is a block diagram of a system that includes the SoC of FIG. 1 with a variable power supply.

FIG. 2 is a block diagram of a system 200 that includes the SoC of FIG. 1 with a switched mode variable power supply (SMPS) 210 and a dual data rate three (DDR3) memory subsystem 220. System 200 may be a video system that may include 4-6 gbyte of DDR3 memory, for example. Cloud computing systems require large amounts of memory that may be provided by DDR3 devices. Consumer systems such as gaming systems may include DDR3 memory and may need to operate in variable ambient temperature situations, for example. These and other types of systems may benefit from embodiments of the present invention.

DDR3 memory 220 is controlled by a DDR3 controller that is included within EMIF 134. Power management module 160 is on-chip SoC 100 and provides control signaling to SMPS 210 to cause it to raise or lower the output voltage VDD provided on voltage output terminal VOUT. Supply voltage VDD is provided via voltage bus 212 to operate DDR3 220 and SoC 100. There may also by other devices and modules within system 200 coupled to voltage bus 212 that use variable supply voltage VDD provided by variable power supply 210. The general operation of DDR3 memory is well known and will not be described in detail herein. Likewise, the general operation of variable switched mode power supplies is well known and will not be described in detail herein. Other types of variable power supplies now known or later developed may also be used, such as a linear regulated supply, a programmable power supply, etc.

Figure 3:
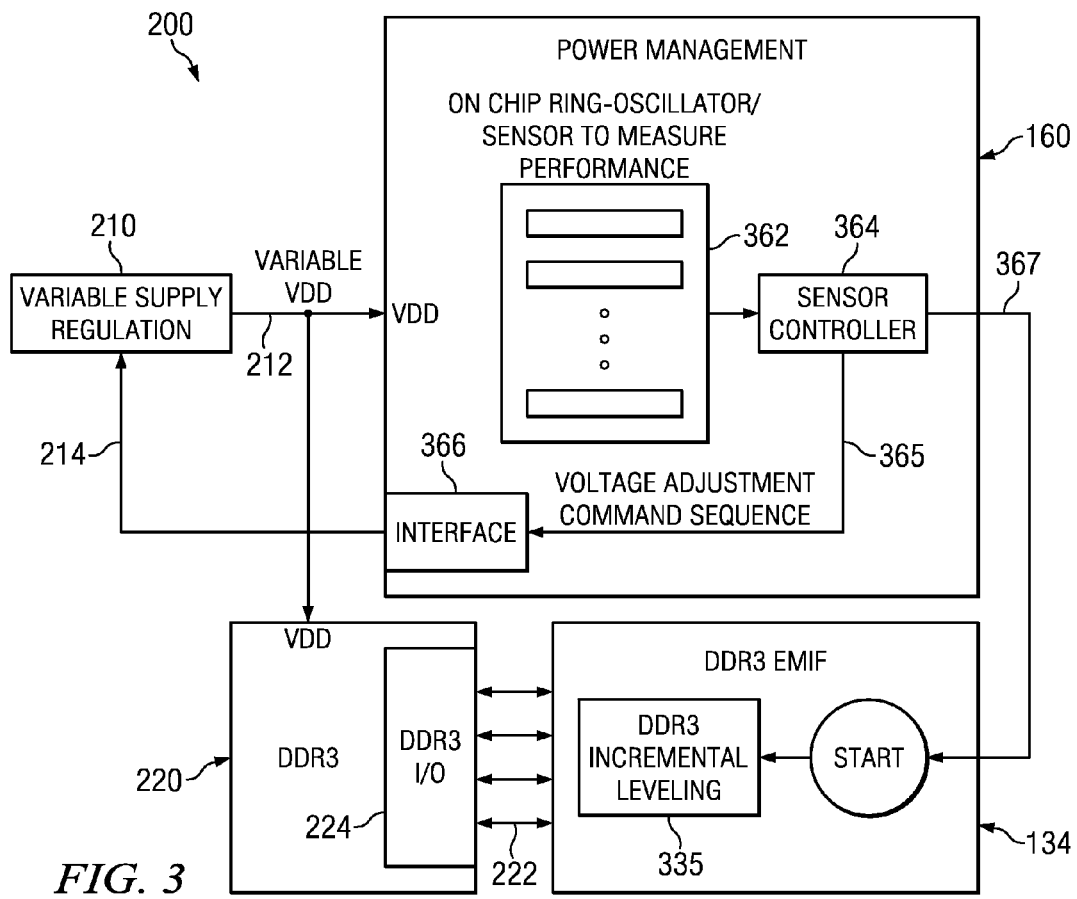
FIG. 3 is a more detailed block diagram of a power management module used in the SoC of FIG. 1.

FIG. 3 is a more detailed block diagram of power management module 160 used in SoC 100. Power management 160 includes one or more sensors 362 that dynamically measure the frequency response of SoC 100 to changes in temperature over time. As a semiconductor chip heats up due to power consumption, the mobility of the electrons in the semiconducting devices increases which cause the performance of the SoC to actually increase as temperature increases; voltage can therefore be reduced while maintaining a desired performance value. Similarly, as the ambient temperature drops and the semiconductor cools down, mobility decreases and performance decreases; voltage may need to be raised to maintain the desired performance value. Each sensor 362 is a free running oscillator whose frequency is therefore dependent on the temperature of a local region of chip substrate on which the sensor is formed. As SoC 100 executes different application programs, the various processing modules and memories will be exercised at different rates, which will cause the temperature of various areas of SoC to rise and fall, based on power consumption due to activity of the various processing modules.

Sensor controller 364 monitors the various sensors 362 to determine the free running frequency at which they are operating in response to local temperature. As the SoC substrate heats up, the frequency of each sensor and the other functional modules of SoC 100 will increase, as explained above. Therefore, power consumption may be reduced by reducing the operating voltage which will then cause the chip performance and temperature to decrease. Sensor controller 364 attempts to control the supply voltage 212 provided by variable power supply 210 in order to maintain a minimum required operating frequency while optimizing power consumption. A voltage adjustment command sequence 365 is sent to interface 366 that is coupled to variable supply 210 via control signal 214. The format of control signal 214 may vary for different implementations. The command sequence instructs variable supply 210 to either raise or lower supply voltage 212 by a small amount. Additional commands are sent to direct further increases or decreases, based on the performance information provided by sensor(s) 362. Typically, a high performance threshold and a low performance threshold are defined. The power management strives to maintain performance level of the SoC within the high and low thresholds. In some embodiments, the thresholds may be changed during operation of the system in response to ambient conditions, power overall power budgets, etc.

As these supply voltage adjustments are made, care must be taken to ensure that performance critical interfaces such as DDR3 are able to operate through these changes in voltage. In this embodiment, DDR3 memory 220 operates on the same supply voltage 212 that is used by SoC 100 and will therefore be subject to the same changes in voltage. By operating on the same voltage, the need for signal level shifters is eliminated. However, the timing operation of DDR3 devices may be sensitive to supply voltage level. Therefore, DDR3 memory 220 may need to be recalibrated as the supply voltage is changed.

When sensor controller 364 sends a voltage adjustment command sequence 365, it also sends a calibration rate notification signal 367 to DDR3 incremental leveling controller 335 that is included within EMIF 134. As mentioned earlier, DDR3 write leveling calibration needs to be performed to account for propagation delay differences in signal wiring 222 connecting the interface 224 of the DDR3 with memory interface 134. Typically, command, address and clock signals are routed to all DDR3 memory devices or banks to simplify routing. Individual data and strobe signals are routed to each memory device or bank. Since the command, address and clock signals are more heavily loaded, they may have a longer propagation time from the memory controller 134 to the memory device interface 224 of each device/bank than the data and strobe signals. To compensate for propagation time discrepancies, each data strobe signal is compensated by delaying it by a calibrated amount of time, as will be described in more detail below.

Power management 160 may perform other types of power management for SoC 100. For example, it may reduce or remove power from various modules that are not currently being used by an application program that is being executed by SoC 100. There may be additional temperature sensors that indicate if the chip temperature is getting too high. If chip temperature gets too high, voltage and/or clock frequency may need to be reduced to significantly reduce power consumption, fans may be instructed to start or speed up, etc.

Figure 4:
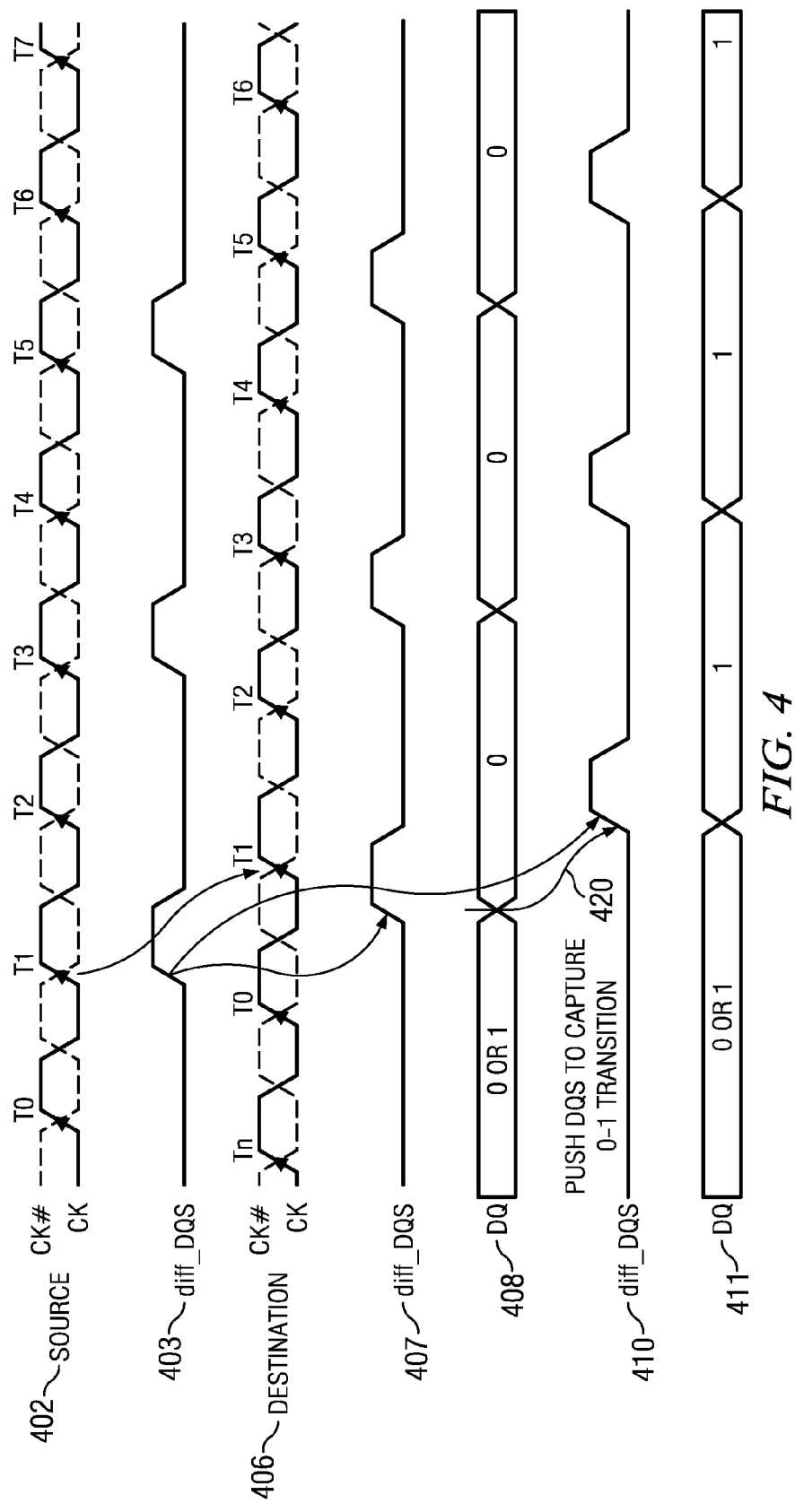
FIG. 4 is a timing diagram illustrating calibration of the DDR3 memory used in the system of FIG. 2.

FIG. 4 is a timing diagram illustrating calibration of the DDR3 memory 220. Source clock signal 402 and data strobe (DQS) 403 are generated by the DDR3 controller in EMIF 134 for each device/bank in DDR3 memory 220. When they arrive at a particular bank of DDR3 memory 220, they may be skewed in time as illustrated by destination clock signal 406 and DQS 407 due to unequal propagation time, as described earlier. Data signals (DQ) 408 are timed with reference to destination DQS 408. During a full calibration, controller 335 incrementally delays the timing of DQS across a range of time indicated by 420. For each rising edge of the delayed DQS signal, the DDR3 interface logic 224 drives the DQ signals with a logical "0" if the destination clock signal 406 is low and with a logical "1 if the destination clock signal is high. In this manner, incremental controller 335 determines what amount of delay is required for each of the DQS signals being sent to DDR3 220 across bus 222 to properly align each DQS signal with the destination clock and address signal timing at each respective bank of memory. Each determined delay value is then stored in incremental controller 335 and used from then on during each memory access. Details of write level timing are described in more detail in JEDEC Standard DDR3 SRRAM Specification JESD79-3E, which is incorporated by reference herein.

FIG. 5 is a flow diagram illustrating full DDR3 calibration. During a full calibration 502, controller 335 delays 504 the timing of DQS, initially by only zero or a small amount. At the DDR3 interface, the clock signal is sampled 506 on the rising edge of the delayed DDQS signal. For each rising edge of the delayed DQS signal, the DDR3 interface logic 224 drives 509 the DQ signals with a logical "0" if the destination clock signal 406 is low or drives 508 the DQ signals with a logical "1 if the destination clock signal is high. In this manner, an edge of the clock signal can be determined. As long as the returned DQ signal remains logical 0, the process is repeated by incrementing 504 the delay by a small amount. Once interface logic 224 samples a high value for the clock signal in the rising edge of delayed DQS, the edge of the clock signal has been located and the total required delay is stored 512 in controller 335 for use during each memory access.

In this manner, incremental controller 335 determines what amount of delay is required for each of the DQS signals being sent to DDR3 220 across bus 222 to properly align each DQS signal with the destination clock and address signal timing at each respective bank of memory. Each determined delay value is then stored in incremental controller 335 and used from then on during each memory access.

FIG. 6 is a flow diagram illustrating incremental DDR3 calibration. A full calibration as described with regard to FIGS. 4 and 5 may require a significant amount of time. For this reason, prior systems may only do a calibration when the system is first started, or even only when it is manufactured. In such a case, the compensation delay values may be stored in a permanent manner. However, in order to provide better operation over a wide range of temperature and voltage settings, an embodiment of the invention may perform periodic incremental calibrations.

Incremental calibration is performed periodically 602. For each occurrence, the stored DQS delay value is decremented 604 by one step value. The destination clock signal is sampled 606 and if it is low, as expected, the incremental calibration continues. If it is not low, then additional calibration steps are performed 614, possibly a full calibration as described with regard to FIG. 5. If the first test is successful, then the DQS delay is incremented 608 by one step value. The destination clock signal is sampled 610 and if it is high, as expected, the incremental calibration is complete 612 and the stored delay value is correct. If it is not high, then additional calibration steps are performed 614, possibly a full calibration as described with regard to FIG. 5. Typically, if the two step check fails, then only one or a few more steps 614 are required to locate the clock edge and update 616 the stored DQS delay value. In this manner, a quick calibration may be performed periodically by simply checking on what is expected to be both sides of the clock signal edge. The short calibration operation will not have a significant performance effect; in fact, it may often be performed while the memory system is otherwise idle.

Figure 7:
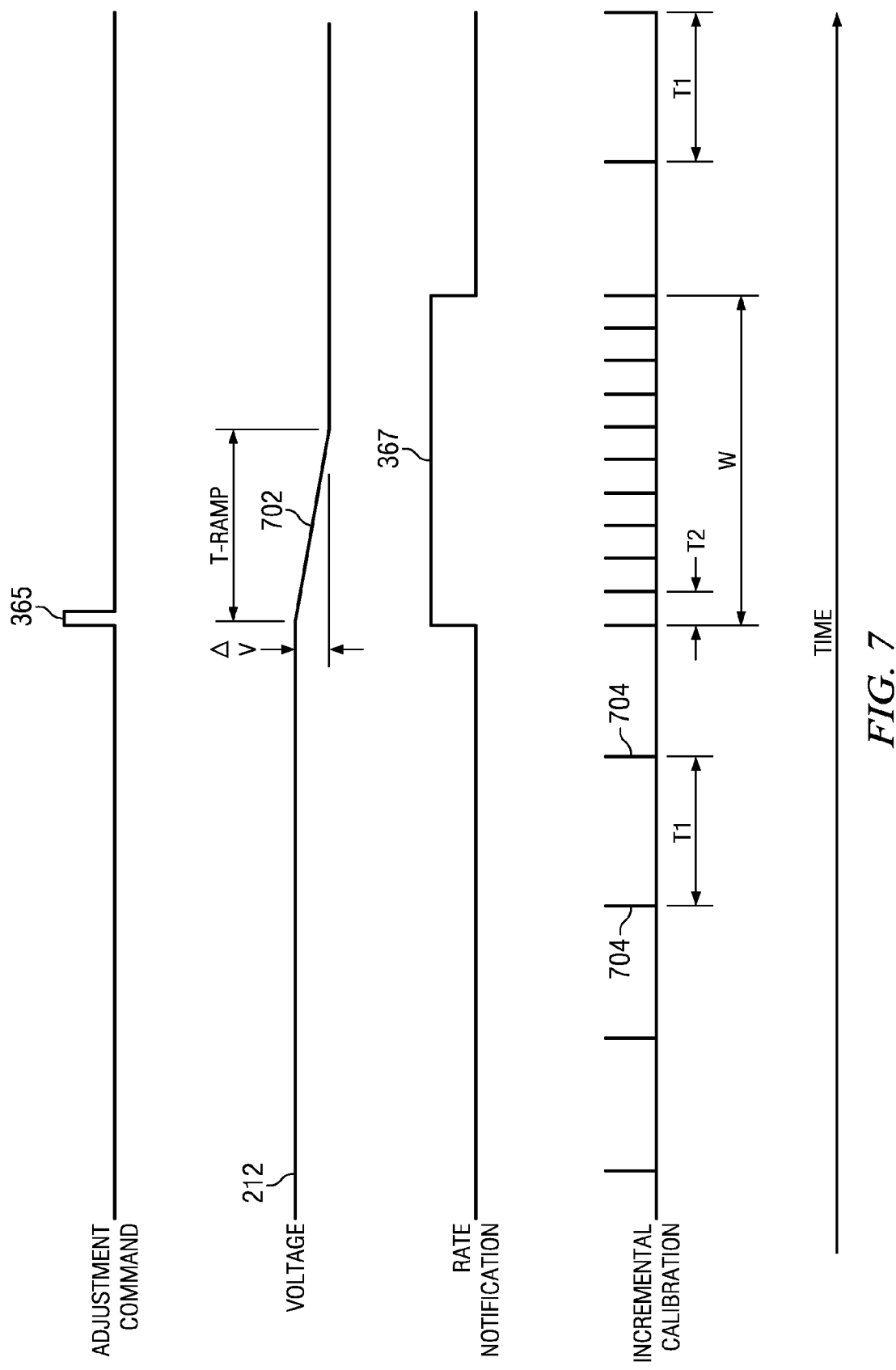
FIG. 7 is a timing diagram illustrating variable rate DDR3 calibration.

FIG. 7 is a timing diagram illustrating variable rate DDR3 calibration in system 200. While the supply voltage 212 is constant, periodic incremental DDR3 calibration 704 is performed at slow rate T1; for example one second, but may be in a range from tens of milli-seconds to tens of seconds.

When power management 160 determines that a performance threshold has been reached and the supply voltage therefore may be adjusted, it sends a voltage adjustment sequence 365 to the variable power supply, as described above. In response to the adjustment command, variable power supply 210 begins a slow ramp of supply voltage 212, as illustrated at 702.

Since the change in voltage will effect the DDR3 operation, the rate at which the incremental calibration is performed is increased to T2, for example, once per millisecond, during a window of time W, but may be in a range a few milli-seconds to several hundred milli-seconds. T2 needs to be short enough to allow the simple two step incremental calibration to track the change in DDR3 performance caused by the voltage ramp by adding only one or few incremental steps to maintain tracking. In general, T2 is smaller than T1, but both may cover a large range. For example T2 may be 1 mS and T1 may be 1 S or T2 may be 10 mS and T1 may be 100 mS. The selection of the value for T1 and T2 is based on the system implementation and supply quality.

The voltage ramp, $\Delta V/T$-ramp, is controlled to match T2. In this embodiment, the voltage ramp is limited to 25 millivolts/10 millisec. Other embodiments may limit the ramp to a higher or a lower rate and adjust T2 accordingly. Rate notification signal 367 is sent from power management 160 to DDR3 incremental leveling controller 335 each time a voltage adjustment is requested. Rate notification signal is active for a longer window of time W than the voltage ramp T-ramp because it will take some amount of time after a voltage ramp is completed for the on-chip temperature to stabilize. Time W may typically by determined by analyzing the operation of SoC 100 and then be treated as a fixed window value. However, in some embodiments the window value may be adjusted dynamically in response to calibration errors.

System Example

Figure 8:
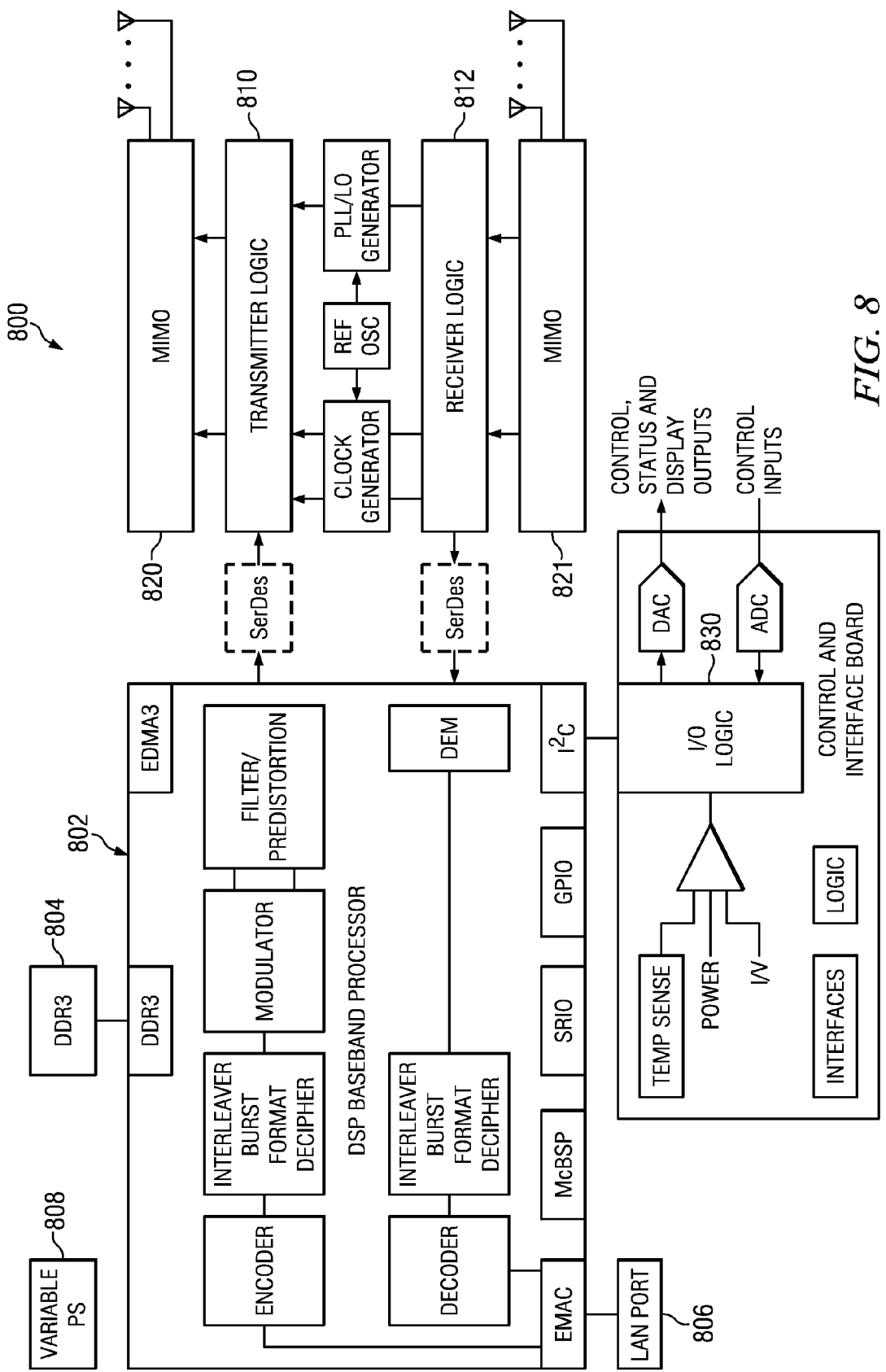
FIG. 8 is a block diagram of another system that includes the SoC of FIG. 1.

FIG. 8 is a block diagram of a base station for use in a radio network, such as a cell phone network. SoC 802 is similar to the SoC of FIG. 1 and is coupled to external memory 804 that may be used, in addition to the internal memory within SoC 802, to store application programs and data being processed by SoC 802. Transmitter logic 810 performs digital to analog conversion of digital data streams transferred by the external DMA (EDMA3) controller and then performs modulation of a carrier signal from a phase locked loop generator (PLL). The modulated carrier is then coupled to multiple output antenna array 820. Receiver logic 812 receives radio signals from multiple input antenna arrays 821, amplifies them in a low noise amplifier and then converts them to digital a stream of data that is transferred to SoC 802 under control of external DMA EDMA3. There may be multiple copies of transmitter logic 810 and receiver logic 812 to support multiple antennas.

The Ethernet media access controller (EMAC) module in SoC 802 is coupled to a local area network port 806 which supplies data for transmission and transports received data to other systems that may be coupled to the internet.

An application program executed on one or more of the processor modules within SoC 802 encodes data received from the internet, interleaves it, modulates it and then filters and pre-distorts it to match the characteristics of the transmitter logic 810. Another application program executed on one or more of the processor modules within SoC 802 demodulates the digitized radio signal received from receiver logic 812, deciphers burst formats, and decodes the resulting digital data stream and then directs the recovered digital data stream to the internet via the EMAC internet interface. The details of digital transmission and reception are well known.

Input/output logic 830 may be coupled to SoC 802 via the inter-integrated circuit (I2C) interface to provide control, status, and display outputs to a user interface and to receive control inputs from the user interface. The user interface may include a human readable media such as a display screen, indicator lights, etc. It may include input devices such as a keyboard, pointing device, etc.

By adjusting the operating voltage of SoC 802 and DDR3 memory 804 provided by variable supply 808 as described in more detail above, power consumption of system 800 can be minimized while maintaining performance within a region established by a high and low threshold within the processor modules of SoC 802 so that data drops are avoided while transferring the time critical transmission data to and from the transmitter and receiver logic. As described in more detail above, incremental recalibration of DDR3 memory 804 performed during ramped changes of the voltage supplied by variable supply 808 maintains calibration of memory 804 in spite of performance and propagation delay changes that may occur due to a resulting change in operating temperature of DDR3 memory 804 and SoC 802.

Other Embodiments

Although the invention finds particular application to Digital Signal Processors (DSPs), implemented, for example, in a System on a Chip (SoC), it also finds application to other forms of processors. A SoC may contain one or more megacells or modules which each include custom designed functional circuits combined with pre-designed functional circuits provided by a design library.

While the invention has been described with reference to illustrative embodiments, this description is not intended to be construed in a limiting sense. Various other embodiments of the invention will be apparent to persons skilled in the art upon reference to this description. For example, read data-eye training may be performed periodically and at a higher rate when the power supply voltage is being adjusted, as describe herein. For read data-eye training, the DDR PHY (controller interface) uses a read DQS (data strobe) to latch the read data sent by DDR during reads. However, the DQS sent by the DDR is edge aligned to the read-data. Therefore, to cleanly latch the read data using the DQS, the DQS received by the DDR PHY needs to be shifted by 90 degrees to center the DQS edges to the read data-eye. The read data-eye training is a hardware algorithm that determines the center of the read data-eye so that the DQS edges have ample margin on both sides to correctly latch the data.

Read DQS gate training may be performed periodically and at a higher rate when the power supply voltage is being adjusted, as describe herein. For read DQS gate training, the DDR PHY uses a read DQS to latch the read data sent by DDR during reads. However, the DQS is a bi-directional signal, that is, it is driven by the DDR PHY on writes for DDR to use the write DQS for latching the write data, and it is driven by the DDR on reads for DDR PHY to use the read DQS for latching read data. Since the read DQS is used as a clock by a FIFO to latch the read data, having glitches on the incoming DQS would be bad (unintentional increment of FIFO pointers). Therefore, the DDR PHY uses a gating mechanism (DQS gate) where the gate is only open during reads and closed any other time (when idle or during writes). The read DQS gate training algorithm determines the appropriate time to open the gate just before the read DQS is received and close the gate as soon as the read is complete.

Other embodiments of the invention are applicable to any training/calibration done for either DDR or other interfaces to gain more margin on timing due to VT drift over a period of time. The timing of the periodic calibration may be selected based on the type of calibration being performed and the rate of change in supply voltage.

In another embodiment, a SERDES device (serializer/deserializer) may need to be periodically calibrated. A SERDES device is self-tuning because the clock is included in the date; however, amplifier gain is critical and needs to be equalized when changes in temperature/voltage occur. Thus, embodiments in which a SERDES device is used may perform low repletion calibration while the supply voltage is constant, but then increase the rate of calibration while the supply voltage is being ramped, as descried herein.

Other types of devices that have operating parameters that are sensitive to voltage or temperature may benefit from an embodiment of the present invention. In various embodiments, these devices may be on the same chip as the device performing the calibration, or they may be on a separate chip coupled to the device performing the calibration.

While a multi-core SoC embodiment was described herein, other embodiments may use only a single core, for example. Another embodiment may be a control device or functional module that does not have an instruction processing unit, for example, but still implements power management and that may benefit by being calibrated to work with a voltage or temperature sensitive device. In another embodiment, the calibration may be performed on a device under control of another device that is coupled to the device being calibrated.

While a DDR3 memory connected to an SoC was described herein, other embodiments may include DDR3 memory, or other types of voltage/temperature sensitive memory now known or later developed, within an SoC. In such an embodiment, the on-chip memory may benefit from the calibration techniques described herein.

Certain terms are used throughout the description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . . " Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

Although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein.

It is therefore contemplated that the appended claims will cover any such modifications of the embodiments as fall within the true scope and spirit of the invention.

What is claimed is:

1. A method of scaling voltage in an integrated circuit, the method comprising:
performing calibration of a functional module controlled by the integrated circuit periodically at a non-zero rate T1;
monitoring at least one operating performance parameter on the integrated circuit to determine when a threshold is reached;
initiating a change to an operating voltage for a portion of the integrated circuit in response to reaching the threshold; and
increasing the rate of performing calibration to a rate T2 higher than rate T1 for a window of time W in response to initiating the change in operating voltage, after which the rate of performing calibration is returned to the rate T1.

2. The method of claim 1, wherein the functional module is a dual data rate three (DDR3) memory module, and wherein the calibration comprises write leveling to compensate for propagation delay of a clock signal and a data strobe signal.

3. The method of claim 2, wherein each periodic calibration comprises incremental write leveling.

4. The method of claim 1, wherein the change in operating voltage is initiated by ramping the voltage from a first level to a second level over a period of time T.

5. The method of claim 4, wherein the window of time W exceeds the period of time T.

6. The method of claim 1, wherein monitoring the at least one parameter comprises determining an operating frequency of a sensor on the integrated circuit, wherein the operating frequency of the sensor is indicative of a temperature sensitive performance metric of the integrated circuit, and wherein the threshold is indicative of a target performance metric value.

7. The method of claim 1, wherein the threshold defines a performance parameter for the integrated circuit.

8. The method of claim 7, wherein the performance parameter is an operating frequency.

9. A system comprising:
a processing module formed on an integrated circuit;

a device controller formed on the integrated circuit, the device controller periodically calibrated while controllably coupled to a functional module;

a performance sensor formed on the integrated circuit measuring at least one operating performance parameter of the integrated circuit;

a power management controller coupled to the performance sensor, wherein the power management controller monitoring at least one parameter for the integrated circuit to determine when a threshold is reached and changing an operating voltage for a portion of the integrated circuit in response to reaching the threshold; and wherein the device controller performs periodic calibration of the functional module at a non-zero rate T1, performs periodic calibration of the functional module at a higher rate T2 higher than rate T1 for a window of time W in response to the power module initiating the change in operating voltage, and performs periodic calibration at rate T1 following expiration of the window of time W.

10. The system of claim 9, wherein the functional module is a dual data rate three (DDR3) memory module, and wherein the calibration comprises write leveling to compensate for propagation delay of a clock signal and a data strobe signal from the device controller.

11. The system of claim 10, wherein each periodic calibration comprises incremental write leveling with two steps.

12. The system of claim 9, wherein the power management controller initiates a voltage change by ramping the voltage from a first level to a second level over a period of time T.

13. The system of claim 12, wherein the window of time W exceeds the period of time T.

14. The system of claim 9, wherein the power management controller monitors the at least one parameter by determining an operating frequency of the performance sensor, wherein the operating frequency of the sensor is indicative of a temperature sensitive performance metric of the integrated circuit, and wherein the threshold is indicative of a target performance metric value.

15. The system of claim 9, wherein the threshold defines a performance parameter for the integrated circuit.

16. The system of claim 15, wherein the performance parameter is an operating frequency of the processing module.

17. The system of claim 9, further comprising:
a memory device interfaced to the device controller, wherein the memory device is calibrated by the device controller; and
a variable power supply controllably coupled to the power management controller, a voltage output of the variable power supply coupled to the integrated circuit and to the memory device.

18. A system, comprising:
means for performing calibration of a functional module controlled by an integrated circuit periodically at a non-zero rate T1;
means for monitoring at least one operating performance parameter on the integrated circuit to determine when a threshold is reached;
means for initiating a change to an operating voltage for a portion of the integrated circuit in response to reaching the threshold; and
means for increasing the rate of performing calibration to a rate T2 higher than rate T1 for a window of time W in response to initiating the change in operating voltage, and performing periodic calibration at rate T1 following expiration of the window of time W.

19. The system of claim 18, wherein the functional module is a dual data rate three (DDR3) memory module, wherein the calibration comprises write leveling to compensate for propagation delay of a clock signal and a data strobe signal, and wherein each periodic calibration comprises incremental write leveling.

20. The system of claim 18, wherein monitoring the at least one parameter comprises determining an operating frequency of a sensor on the integrated circuit, wherein the operating frequency of the sensor is indicative of a temperature sensitive performance metric of the integrated circuit, and wherein the threshold is indicative of a target performance metric value.

21. The system of claim 18, wherein:
the means for initiating the change in the operating voltage ramps the voltage from a first level to a second level over a period of time T.

22. The system of claim 21, wherein:
the window of time W exceeds the period of time T.

* * * * *